US010920002B2

(12) United States Patent
Moore et al.

(10) Patent No.: US 10,920,002 B2
(45) Date of Patent: Feb. 16, 2021

(54) 3D PRINTING OF THERMOSET POLYMERS AND COMPOSITES (71) Applicant: The Board of Trustees of the University of Illinois, Urbana, IL (US)

(72) Inventors: Jeffrey S. Moore, Savoy, IL (US); Scott R. White, Champaign, IL (US); Ian D. Robertson, Philadelphia, PA (US); Nancy R. Sottos, Champaign, IL (US); Jia En Aw, Champaign, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 283 days.

(21) Appl. No.: 15/979,029

(22) Filed: May 14, 2018

(65) Prior Publication Data
US 2018/0327531 A1 Nov. 15, 2018

Related U.S. Application Data (60) Provisional application No. 62/506,167, filed on May 15, 2017.

(51) Int. Cl.
B29C 71/02 (2006.01)
B29C 71/04 (2006.01)
(Continued)

(52) U.S. Cl.
CPC ............ *C08F 232/08* (2013.01); *B29C 48/05* (2019.02); *B29C 48/87* (2019.02); *B29C 48/911* (2019.02); *B29C 64/106* (2017.08); *B29C 64/118* (2017.08); *B29C 64/209* (2017.08); *B29C 70/384* (2013.01); *B33Y 10/00* (2014.12);
(Continued)

(58) Field of Classification Search
CPC ....... B29C 48/05; B29C 48/384; B29C 48/87; B29C 48/911; B29C 64/118; B29C 71/02; B29C 71/04; B29K 2023/38; B29K 2105/0014; B29K 2105/0061; B33Y 10/00; B33Y 70/00; C08F 2/46; C08F 2/48; C08F 4/60; C08G 61/08; C08K 5/524
USPC ... 264/176.1, 211, 211.14, 211.17, 236, 237, 264/308, 331.17, 494, 495, 496; 524/856; 526/145, 283
See application file for complete search history.

(56) References Cited

U.S. PATENT DOCUMENTS 6,803,429 B2 10/2004 Morgan et al.
2005/0250878 A1 11/2005 Moore et al.
(Continued)

FOREIGN PATENT DOCUMENTS

WO 2017134674 A1 8/2017

OTHER PUBLICATIONS

Mariani et al., "Frontal Ring-Opening Metathesis Polymerization of Dicyclopentadiene", Macromolecules, vol. 34 (2001), p. 6539-6541.*

(Continued)

*Primary Examiner* — Leo B Tentoni
(74) *Attorney, Agent, or Firm* — Brinks Gilson & Lione

(57) ABSTRACT

The present disclosure provides a novel method of 3D printing using frontal polymerization chemistry. This method enables the printing of tough, high quality thermosets in a short time with the option of adding fiber reinforcement. As such, it facilitates fabrication of mechanically robust 3D-printed devices and structures.

14 Claims, 10 Drawing Sheets

2nd Generation Grubbs Catalyst

Dicyclopentadiene (51) Int. Cl.

| | | |
|---|---|---|
| *C08F 2/46* | (2006.01) | |
| *C08F 2/48* | (2006.01) | |
| *C08F 4/60* | (2006.01) | |
| *C08G 61/08* | (2006.01) | |
| *C08F 232/08* | (2006.01) | |
| *C08K 7/06* | (2006.01) | |
| *B33Y 10/00* | (2015.01) | |
| *B29C 64/118* | (2017.01) | |
| *B33Y 70/00* | (2020.01) | |
| *B29C 70/38* | (2006.01) | |
| *B29C 64/106* | (2017.01) | |
| *B33Y 30/00* | (2015.01) | |
| *B29C 64/209* | (2017.01) | |
| *B29C 48/87* | (2019.01) | |
| *B29C 48/88* | (2019.01) | |
| *B29C 48/05* | (2019.01) | |
| *C08K 3/04* | (2006.01) | |
| *B29K 307/04* | (2006.01) | |
| *B29K 101/10* | (2006.01) | |
| *B29K 105/00* | (2006.01) | |
| *C08K 5/524* | (2006.01) | |
| *B29K 23/00* | (2006.01) | |

(52) U.S. Cl.
CPC .............. *B33Y 30/00* (2014.12); *B33Y 70/00* (2014.12); *C08K 7/06* (2013.01); *B29K 2023/38* (2013.01); *B29K 2101/10* (2013.01); *B29K 2105/0014* (2013.01); *B29K 2105/0061* (2013.01); *B29K 2307/04* (2013.01); *C08K 3/04* (2013.01); *C08K 5/524* (2013.01)

(56) References Cited

U.S. PATENT DOCUMENTS

| | | | |
|---|---|---|---|
| 2010/0029801 A1* | 2/2010 | Moszner | ................ B33Y 70/00 522/167 |
| 2015/0328848 A1 | 11/2015 | Patrick et al. | |
| 2016/0236983 A1* | 8/2016 | Buergel | .................. C04B 26/02 |
| 2016/0354977 A1* | 12/2016 | Gordon | ................ B29C 64/118 |
| 2017/0101488 A1 | 4/2017 | Thomson et al. | |
| 2017/0240694 A1 | 8/2017 | Schrock et al. | |
| 2019/0039321 A1* | 2/2019 | Matzner | ................ B33Y 70/00 |
| 2019/0202953 A1* | 7/2019 | Lesser | ...................... C08F 2/48 |

OTHER PUBLICATIONS

Compton et al., "3D-Printing of Lightweight Cellular Composites," Adv Mater., 26(34):5930-5935, Sep. 2014.

Robertson et al., "Frontal Ring-Opening Metathesis Polymerization of Exo-Dicyclopentadiene for Low Catalyst Loadings," ACS Macro Lett., 5(5):593-596, Apr. 2016.

White et al., "A Simultaneous Lay-Up and in situ Cure Process for Thick Composites," J Reinf Plast Comp., 12:520-535, May 1993.

\* cited by examiner

2nd Generation Grubbs Catalyst

Dicyclopentadiene

3D PRINTING OF THERMOSET POLYMERS AND COMPOSITES

RELATED APPLICATIONS

This application claims priority under 35 U.S.C. § 119(e) to U.S. Provisional Patent Application No. 62/506,167, filed May 15, 2017, which is incorporated herein by reference.

GOVERNMENT SUPPORT

This invention was made with government support under Grant No. FA9550-16-1-0017 awarded by the U.S. Air Force and DE-AC02-06CH11357 awarded by the U.S. Department of Energy. The government has certain rights in the invention.

BACKGROUND OF THE INVENTION

Current 3D printing techniques are generally only amenable to thermoplastics and low-quality thermoset resins. Those that can produce structural, high quality thermosets require a post-printing cure step that requires a number of hours for curing.

Common 3D-printing techniques such as fused deposition modelling (FDM) and stereolithography (SLA) are known to produce materials that have poor mechanical properties. In FDM, a thermoplastic filament is extruded through a heated print head in a defined pattern to produce a 3D part layer by layer. However, the layer by layer method of deposition enables delamination between polymer layers in the final part. Furthermore, the thermoplastic polymers used for 3D printing do not typically possess the stiffness and strength required for high performance applications.

The SLA printing technique uses ultraviolet light to cure a photosensitive resin in a defined pattern by projecting the pattern into a bath of liquid resin. However, there are a limited number of polymer chemistries amenable to SLA, and the polymers that can be so produced are typically too brittle for engineering applications. Furthermore, the requirement for light to penetrate the sample precludes the use of optically opaque reinforcing materials.

Given these limitations, it is highly difficult to fabricate continuous fiber-reinforced thermoset composites via 3D printing. One method that has been adopted is the extrusion of a partially cured resin containing a continuous fiber reinforcement. The material is essentially a B-stage resin, which is traditionally cured during printing using the constant application of UV-light at the print head or after printing using a conventional thermal cure cycle. Applying UV-light during printing is challenging, since building on layers requires the resin to be fully cured before the print head advances. This slows the process and requires additional lighting equipment to facilitate. Adding a conventional thermal cure cycle to the end of the printing process also increases production time by more than 1 hour.

The problem is there is a lack of thermoset compositions that can cure rapidly during printing to provide structures that do not delaminate. Accordingly, there is a need for a self-curing thermoset composition for printing methods that do not require external irradiation to provide structures of good mechanical integrity.

SUMMARY

This disclosure enables 3D-printing of high quality thermosets that cure during the printing process. It also allows printing of free-standing structures with no support material. Furthermore, it enables printing of continuous thermoset fiber-reinforced composites, which are not printable by other techniques.

The process uses a gelled solution of monomer and catalyst that is extruded from a print head onto a heated surface. As the printing continues, a propagating polymerization front forms and propagates through the extruded gel, fully curing it in seconds. This can be further combined with the extrusion of a fiber reinforcement to allow 3D printing of continuous fiber reinforced thermoset composites.

The process uses a highly exothermic curing reaction, such that the printed material can cure itself without continuous external photo or thermal stimulus. The process uses a printing strategy involving the extrusion of a partially cured resin in combination with a rapid curing technique based on frontal polymerization (FP). Frontal polymerization (FP) is a self-propagating reaction that is driven by the heat of an exothermic polymerization reaction. A partially cured frontally polymerizable resin is extruded from a print head optionally containing a fiber reinforcing element. A small thermal stimulus ignites FP by activating a latent initiator, which releases the heat of polymerization, which activates further initiator and ultimately produces a propagating reaction wave that can quickly polymerize all available monomer. The polymerization wave propagates through the printed material rapidly curing it with no further energy input. No further treatment of the printed parts is required after FP is complete. This rapid curing is enabled by recent advances in frontal polymerization chemistry.

Under specific conditions, the speed of the polymerization wave can self-equilibrate to the designed printing speed. This allows the material to cure immediately after extrusion even when the printing process uses varying print speeds, which has not possible with conventional 3D-printing. Alternatively, print speed and chemistry can be matched to allow one layer to be deposited in the time it takes to cure the layer below it, enabling concurrent curing and printing at high speed. This process should be much faster than other techniques for printing fiber composites, while still producing high quality materials. Furthermore, it is easily adaptable to commercially available printing equipment, enabling widespread use.

Accordingly, this disclosure provides a composition for an organic phosphite, a ruthenium (II) catalyst, a ruthenium catalyst, a cycloalkene, and an organic solvent, wherein the mixture forms a thermoset gel having a storage modulus of about 10 Pascals to about 10,000 Pascals.

This disclosure also provides a method for fabricating a printed thermoset polymer from the composition above, comprising:

a) extruding the thermoset gel from a dispensing apparatus to provide an extruded thermoset gel; and
b) triggering a frontal polymerization of the extruded thermoset gel, wherein the frontal polymerization propagates and cures the extruded thermoset gel;
wherein a printed thermoset polymer is printed by steps comprising steps a) and b).

Additionally, this disclosure provides a method for polymerizing a thermoset gel comprising:

a) extruding a thermoset gel onto a platform from a cooled dispensing apparatus to provide an extruded thermoset gel; and
b) heating the platform to trigger a frontal polymerization of the extruded thermoset gel, wherein the frontal polymerization propagates and cures the extruded thermoset gel;

wherein the thermoset gel comprises triethyl phosphite, dichloro[1,3-bis(2,4,6-trimethylphenyl)-2-imidazolidinylidene](benzylidene)(tricyclohexylphosphine)ruthenium(II), and a dicyclopentadiene;

wherein the thermoset gel is thereby polymerized.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

This disclosure provides a new process of 3D printing using frontal polymerization (FP) chemistry that enables 3D-printing of tough, high quality thermosets in a short time with the option of adding fiber reinforcement. As such, it facilitates fabrication of mechanically robust 3D-printed devices and structures. Minimal infrastructure is required to support this process, as it can be adapted to standard extrusion printing devices.

For FP chemistry to be amenable to 3D-printing, it must fulfill several requirements. First, since a microscale filament is undergoing FP, there will be substantial heat loss to the environment during reaction. Thus, the reaction must be extremely exothermic and react quickly to allow the FP to propagate despite this heat loss. This rules out frontally polymerized engineering thermosets such as epoxy, which do not react quickly enough. Second, the FP'ed material must be robust enough to act as a structural polymer. Highly reactive acrylate FP would likely provide a workable printing solution, but it produces a brittle polymer that would not serve well for a composite matrix for example. Finally, the reactive FP solution must be able to maintain a viscous gel-like state for the entire printing period, such that it can be extruded from a 3D-printing nozzle, while remaining amenable to FP after extrusion. Together, these requirements seem to have prevented any development of FP-related 3D-printing solutions.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the end-points of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture.

A "sufficient amount" refers to an amount of time to bring about a recited effect, such as an amount necessary time between extrusion and frontal polymerization to form a printed structure. Determination of a sufficient amount is typically within the capacity of persons skilled in the art, especially in light of the detailed disclosure provided herein. Thus, a "sufficient amount" generally means an amount of time that provides the desired effect.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

A "solvent" as described herein can include water or an organic solvent. Examples of organic solvents include hydrocarbons such as toluene, xylene, hexane, and heptane; chlorinated solvents such as methylene chloride, chloroform, and dichloroethane; ethers such as diethyl ether, tetrahydrofuran, and dibutyl ether; ketones such as acetone and 2-butanone; esters such as ethyl acetate and butyl acetate; nitriles such as acetonitrile; alcohols such as methanol, ethanol, and tert-butanol; and aprotic polar solvents such as N,N-dimethylformamide (DMF), NN-dimethylacetamide (DMA), and dimethyl sulfoxide (DMSO). Solvents may be used alone or two or more of them may be mixed for use to provide a "solvent system".

As used herein, the term "substituted" or "substituent" is intended to indicate that one or more (for example, 1-20 in various embodiments, 1-10 in other embodiments, 1, 2, 3, 4, or 5; in some embodiments 1, 2, or 3; and in other embodiments 1 or 2) hydrogens on the group indicated in the expression using "substituted" (or "substituent") is replaced with a suitable group known to those of skill in the art, provided that the indicated atom's normal valency is not exceeded, and that the substitution results in a stable compound.

The term "alkyl" refers to a branched or unbranched hydrocarbon having, for example, from 1-20 carbon atoms, and often 1-12, 1-10, 1-8, 1-6, or 1-4 carbon atoms. As used herein, the term "alkyl" also encompasses a "cycloalkyl". Alkyl can also be substituted with one or more substituents.

The term "cycloalkyl" refers to cyclic alkyl groups of, for example, from 3 to 10 carbon atoms having a single cyclic ring or multiple condensed rings. Cycloalkyl groups include, by way of example, single ring structures such as cyclopropyl, cyclobutyl, cyclopentyl, cyclooctyl, and the like, or multiple ring structures such as adamantyl, and the like. Cycloalkyl can also be substituted with one or more substituents.

The term "aryl" refers to an aromatic hydrocarbon group derived from the removal of at least one hydrogen atom from a single carbon atom of a parent aromatic ring system. The radical attachment site can be at a saturated or unsaturated carbon atom of the parent ring system. The aryl group can have from 6 to 30 carbon atoms, for example, about 6-10 carbon atoms. The aryl can also be substituted with one or more substituents.

The term "frontal polymerization" refers a process in which the polymerization reaction propagates through a vessel or a substance. There are three types of frontal polymerizations: thermal frontal polymerization (TFP) that uses an external energy source to initiate the front; photofrontal polymerization (PFP), in which the localized reaction is driven by an external UV source; and isothermal frontal polymerization (IFP), which relies on the Norrish-Trommsdorff, or gel effect, that occurs when monomer and initiator diffuse into a polymer seed (small piece of polymer). Thermal frontal polymerization begins when a heat source contacts a solution of monomer and a thermal initiator or catalyst. Alternatively, a UV source can be applied if a photoinitiator is also present. The area of contact (or UV exposure) has a faster polymerization rate, and the energy from the exothermic polymerization diffuses into the adjacent region, raising the temperature and increasing the reaction rate in that location. The result is a localized reaction zone that propagates down the reaction vessel as a thermal wave.

The term "ring-opening metathesis polymerization (ROMP)" refers to a type of olefin metathesis chain-growth polymerization that produces industrially important products. The driving force of the reaction is relief of ring strain in cyclic olefins (e.g. norbornene or cyclopentene). Thus, "frontal ring-opening metathesis polymerization (FROMP)" entails the conversion of a monomer into a polymer via a localized exothermic reaction zone that propagates through the coupling of thermal diffusion and Arrhenius reaction kinetics. The pot-life, get-time, and reaction kinetics can be controlled through various modifications of the polymerization chemistry.

The terms "pot life" and "working life" are often taken to mean the same thing for mixtures comprising reactive monomers. Pot-life is the amount of time between the mixing of monomer and initiator or catalyst and the point at which frontal polymerization is no longer possible. It can also refer to the amount of time it takes for an initial viscosity of a composition to double, or quadruple. Timing starts from the moment the product is mixed, and is measured at room temperature. Working life, refers to the amount of time a mixture remains low enough in viscosity that it can still be easily applied to a part or substrate in a particular application. For that reason, working life can vary from application to application, and even by the application method of the reactive mixture. Pot life can act as a guide in determining working life by providing a rough timeline of viscosity growth.

The term "rheology modifier" refers to adjusted formulations that can alter the flow behavior or viscosity of compositions depending on the application.

The term "thixotropic filler" refers to a substance that can be added to the disclosed composition to give it thixotropic or shear thinning property. Certain gels or fluids that are thick, or viscous, under static conditions will flow (become thin, less viscous) over time when shaken, agitated, sheared or otherwise stressed.

The term "storage modulus" is defined as a measure of elasticity of a material. It is the measured stored energy, representing the elastic portion, and the loss modulus measures the energy dissipated as heat, representing the viscous portion. The storage (and loss modulus) indicate the stress response for a visco-elastic fluid in oscillatory shear. If applying a shear strain-rate that is cosine; a viscous fluid will have stress proportional to the shear strain-rate (Newtonian); and an elastic solid will have stress proportional to the shear strain (sine—integral of cosine). A visco-elastic response will be a mixture of the two. The storage modulus is the elastic solid like behavior (G') and the loss modulus is the viscous response (G"). These will cross-over when the frequency is equal to the reciprocal relaxation time.

Embodiments of the Invention

Enablement of 3D-printing of tough, high quality thermosets in a short time with the option of adding fiber reinforcement to facilitate fabrication of mechanically robust 3D-printed devices and structures is described herein. Minimal infrastructure is required to support this process, as it can be adapted to standard extrusion printing devices. A gelled solution of monomer and catalyst is extruded from a print head onto a heated surface. As the printing continues, a propagating polymerization front forms and propagates through the extruded gel that has a composition which can fully cure it in as little as a few seconds, or longer if required. This composition can be further combined with the extrusion of a fiber reinforcement to allow 3D printing of continuous fiber reinforced thermoset composites. The concept of 3D-printing via frontal polymerization through printed resin has been demonstrated for using several formulations of a dicyclopentadiene resin, ruthenium catalyst, and phosphite inhibitor. Freeform and layer-by-layer polymer structures have been fabricated using this technique.

Accordingly, this disclosure provides various embodiments of a composition for a thermoset gel comprising a mixture of an organic phosphite, a ruthenium (II) catalyst, a cycloalkene, and an organic solvent, wherein the mixture forms a thermoset gel having a storage modulus of about 10 Pascals to about 10,000 Pascals.

In additional embodiments, the organic phosphite comprises one or more of $P(OR)_3$, wherein R is $(C_1-C_{10})$alkyl (preferably $(C_1-C_6)$alkyl), or aryl (or a substituted aryl). In some other embodiments, the phosphite comprises trimethyl phosphite, triethyl phosphite, tripropyl phosphite, triisopropyl phosphite, tri-n-butyl phosphite, tri-sec-butyl phosphite, tri-tert-butyl phosphite, triphenyl phosphite, or a combination thereof.

In other additional embodiments, the ruthenium catalyst comprises dichloro[1,3-bis(2,4,6-trimethylphenyl)-2-imidazolidinylidene](benzylidene)(tricyclohexylphosphine)ruthenium(II) (GC2), dichloro[1,3-bis(2,4,6-trimethylphenyl)-2-imidazolidinylidene] (indenylidene) (tricyclohexylphosphine)ruthenium(II), dichloro[1,3-bis(2,4,6-trimethylphenyl)-2-imidazolidinylidene](indenylidene)(triisopropylphosphite)ruthenium(II), or a combination thereof.

In yet other additional embodiments, the cycloalkene comprises a norbornene, an endo-dicyclopentadiene (DCPD), an exo-DCPD, a cyclobutene, a cyloctene, a cyclooctadiene, a cyclooctatetraene, or a combination thereof. In additional embodiments, the organic solvent comprises an aryl organic solvent or an alkyl-substituted aryl organic solvent. In some embodiments, the organic solvent comprises benzene, ethylbenzene, diethylbenzene, dichlorobenzene, cyclohexylbenzene, n-methylpyrrolidone, toluene, xylene, mesitylene, or a combination thereof. In other embodiments, the organic solvent is polar, or non-polar.

In other embodiments, the mixture comprises about 0.1 mole equivalents to about 10 mole equivalents of the organic phosphite based on moles of the ruthenium catalyst in the mixture. In yet other embodiments, the molar equivalents of the phosphite is about 0.3 to about 8, about 0.5 to about 5, or about 0.2 to about 2. In some other embodiments, the disclosed composition further comprises a carbon fiber, a thixotropic filler, a rheology modifier, or a combination thereof. In other embodiments the composition comprises an anti-thixotropic filler. In some additional embodiments, the storage modulus is about 50 Pascals to about 5000 Pascals. In other embodiments, the storage modulus is about 100 Pascals to about 1000 Pascals, about 80 Pascals to about 1500 Pascals, or about 200 Pascals to about 1200 Pascals.

This disclosure also provides various embodiments of a method for fabricating a printed thermoset polymer comprising:
a) extruding the disclosed thermoset gel from a dispensing apparatus to provide an extruded thermoset gel; and
b) triggering a frontal polymerization of the extruded thermoset gel, wherein the frontal polymerization propagates and cures the extruded thermoset gel;
wherein a printed thermoset polymer is printed by steps comprising steps a) and b).

In some embodiments, the thermoset gel is cooled below 25° C. In other embodiments, the dispensing apparatus is cooled below 25° C. In yet other embodiments, the thermoset gel or dispensing apparatus is cooled to about 25° C. to about −80° C., about 20° C. to about −40° C., about 10° C. to about −20° C., or about 5° C. to about −30° C. In other embodiments the dispensing apparatus is cooled by a refrigerant or a Peltier cooler. In some other embodiments, the thermoset gel is stored in a cooler such as a refrigerator.

In additional embodiments, the extruded thermoset gel is extruded onto a platform that can trigger frontal polymerization. In yet other embodiments, the platform is heated. In additional embodiments, the frontal polymerization is triggered at a temperature (or heated platform temperature) of about 30° C. to about 100° C., about 50° C. to about 150° C., about 75° C. to about 180° C., about 50° C. to about 200° C., about 100° C. to about 250° C., or about 120° C. to about 300° C., In other embodiments, the platform is a glass or metal plate or slide that is heated with a heating element or heating device. In yet additional embodiments, frontal polymerization is triggered by a chemical initiator, or electromagnetic irradiation, such as ultraviolet light.

In various embodiments, the frontal polymerization propagates and cures the extruded thermoset gel instantly (about 1 second or less than one second) to about 60 minutes after the thermoset gel is extruded. In other embodiments, the frontal polymerization propagates and cures the extruded thermoset gel a sufficient amount of time after the thermoset gel is extruded. In yet other various embodiments, the frontal polymerization is delayed by a sufficient amount of time to allow a second layer of extruded thermoset gel to coalesce or crosslink with a first layer of extruded thermoset gel. In yet other embodiments the sufficient amount of time is about 0.01 seconds to about 5 hours, about 1 second to about 2 hours, about 1 second to about 1 hour, about 1 second to about 50 minutes, about 1 second to about 40 minutes, about 1 second to about 30 minutes, about 1 second to about 20 minutes, about 1 second to about 10 minutes, or about 1 second to about 5 minutes.

Additionally, this disclosure also provides various embodiments of a method for polymerizing a thermoset gel comprising:

a) extruding a thermoset gel onto a platform from a cooled dispensing apparatus to provide an extruded thermoset gel; and
b) heating the platform to trigger a frontal polymerization of the extruded thermoset gel, wherein the frontal polymerization propagates and cures the extruded thermoset gel;
wherein the thermoset gel comprises triethyl phosphite, dichloro[1,3-bis(2,4,6-trimethylphenyl)-2-imidazolidinylidene](benzylidene)(tricyclohexylphosphine)ruthenium(II), and a dicyclopentadiene;
wherein the thermoset gel is thereby polymerized (i.e., fabricated).

In some embodiments, the thermoset gel comprises an additive to lower the melting point of the dicyclopentadiene. In some other embodiments, the additive is a norbornene. In other embodiments the norbornene is 5-ethylidene norbornene.

In some embodiments the melting point is lowered by about 1° C. to about 30° C., or about 2° C. to about 15° C. In other embodiments, the amount of the additive is about 0.1 weight % to about 15 weight %, relative to the weight of the cycloalkane. In yet other embodiments, the amount of additive is 1 wt. % to 10 wt. %, or 2 wt. % to 8 wt. %. In yet other embodiments, the thermoset gel has a storage modulus of about 50 Pascals to about 5,000 Pascals. In additional embodiments, the extruded thermoset gel is a carbon fiber composite.

This disclosure provides ranges, limits, and deviations to variables such as volume, mass, percentages, ratios, etc. It is understood by an ordinary person skilled in the art that a range, such as "number1" to "number2", implies a continuous range of numbers that includes the whole numbers and fractional numbers. For example, 1 to 10 means 1, 2, 3, 4, 5, . . . 9, 10. It also means 1.0, 1.1, 1.2. 1.3, . . . , 9.8, 9.9, 10.0, and also means 1.01, 1.02, 1.03, and so on. If the variable disclosed is a number less than "number10", it implies a continuous range that includes whole numbers and fractional numbers less than number10, as discussed above. Similarly, if the variable disclosed is a number greater than "number10", it implies a continuous range that includes whole numbers and fractional numbers greater than number10. These ranges can be modified by the term "about", whose meaning has been described above.

Adapting FP Chemistry to 3D-Printing

Frontal ring-opening metathesis polymerization via ruthenium catalysis has previously been shown to be an effective means for quickly producing polydicyclopentadiene (PDCPD). Polydicyclopentadiene (PDCPD) is a material of growing importance in the fabrication of durable parts due to its low density; high toughness, impact strength, and stiffness; and chemical resistance.[1] There is also interest in using it for fabricating fiber-reinforced composites.[2]

Previous FROMP chemistry had not been useful for 3D-printing, due to its lack of stability caused by the ruthenium catalyst's high activity toward the DCPD monomer. Inhibitors such as triphenyl phosphine and dimethylaminopyridine (DMAP), which were shown in the literature to completely suppress catalysis in other systems, only increased the pot lives of liquid DCPD/catalyst mixtures to, at most, 30 minutes. After this time, the material would either undergo rapid spontaneous exothermic polymerization or would gel and shortly afterward become unable to achieve FROMP. Furthermore, these inhibitors significantly reduced the frontal velocity, to the point where FROMP would not occur.

Alkyl phosphites are a class of inhibitors for FROMP that dramatically extend pot life, while minimally affecting frontal velocity. There has been little exploration of phosphites as inhibitors for ROMP catalysts, probably because of how much they hinder reaction at room temperature. In the past 5 years, there have been a few examples of catalysts synthesized with phosphite ligands that exhibited good high-temperature activity in ring-opening metathesis reactions not seen at low temperature.[3-5] These results indicated phosphites might exhibit good characteristics as inhibitors for FROMP, since they would bind strongly enough to the ruthenium to prevent room temperature reaction, but not strongly enough to prevent high temperature reactions.

Initial experiments showed phosphites to be far superior to previously used DMAP. Low concentrations (0.3-8 eq. to catalyst) of trimethylphosphite (TMP), triethylphosphite (TEP), and tributylphosphite (TBP) were shown to extend gelation from 12 minutes to >30 h while still enabling FP.

Figure 4:
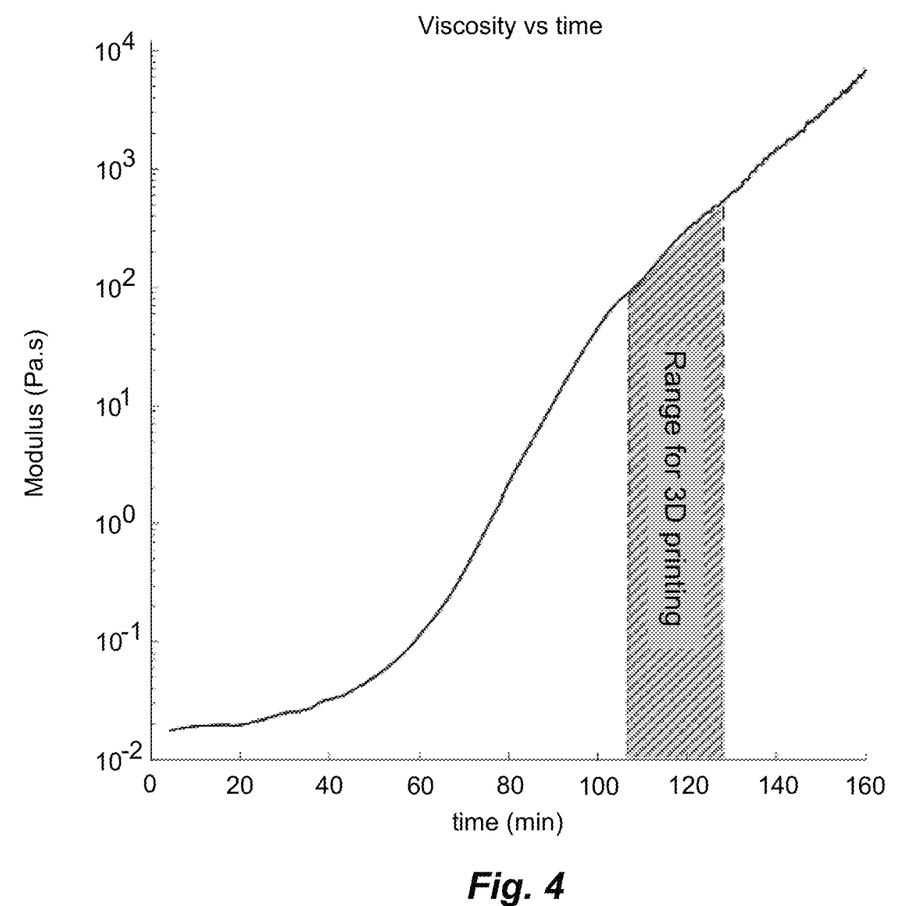
FIG. 4. Viscosity vs. Time when TEP inhibitor is added.

The key, enabling discovery for 3D-printing was that there was an extended processing window after gelation wherein the material was still frontally polymerizable. This had never been observed for DMAP-inhibited FROMP, since the material reacted too fast after gelation. However, with the potent phosphite inhibitors, the "reactive gel" period was extended to several hours or more. Thus, partially cured gel-FROMP solution could be used as a 3D-printing ink that could undergo FP immediately after printing to produce an engineering thermoset polymer. Characterizing the curing process rheologically, enabled a determination of precisely when the material would reach the desired viscosity for printing. (FIG. 4) Processing was further enabled by freezing the gel-FROMP solutions as soon as they reached this point, essentially halting reaction, and allowing for printing of the B-stage PDCPD on demand.

Since FROMP of DCPD releases thermal energy very quickly, it can occur in single gel filaments extruded by the print head. Since there is a rapid transition from gel to solid, the material is self-supporting, requiring no secondary material to facilitate printing, as is the case with traditional thermoplastic 3D-printing systems. Instead, a freeform structure can be printed in whatever geometry is desired.

While we have not yet demonstrated this, a layer-by-layer approach should also be feasible, wherein a front propagates from the ground up, while the printer lays down layers of material at a commensurate rate. Thus, each gel layer should be able to merge with the previous one before being frontally polymerized.

The current strategy focuses entirely on printing the partially cured DCPD material, since it possesses a desirably high viscosity. This strategy was chosen because of its simplicity, since it allows for a single-component system. However, the material's viscosity will change over time as it cures at room temperature. This factor is currently mitigated by cooling the printing barrel, but there is another solution that should also be feasible. Thixotropic fillers are well known to increase viscosity at relatively low loadings. By incorporating these, we could print immediately after mixing up the solution and, thus, extend the processing window.

Figure 5:
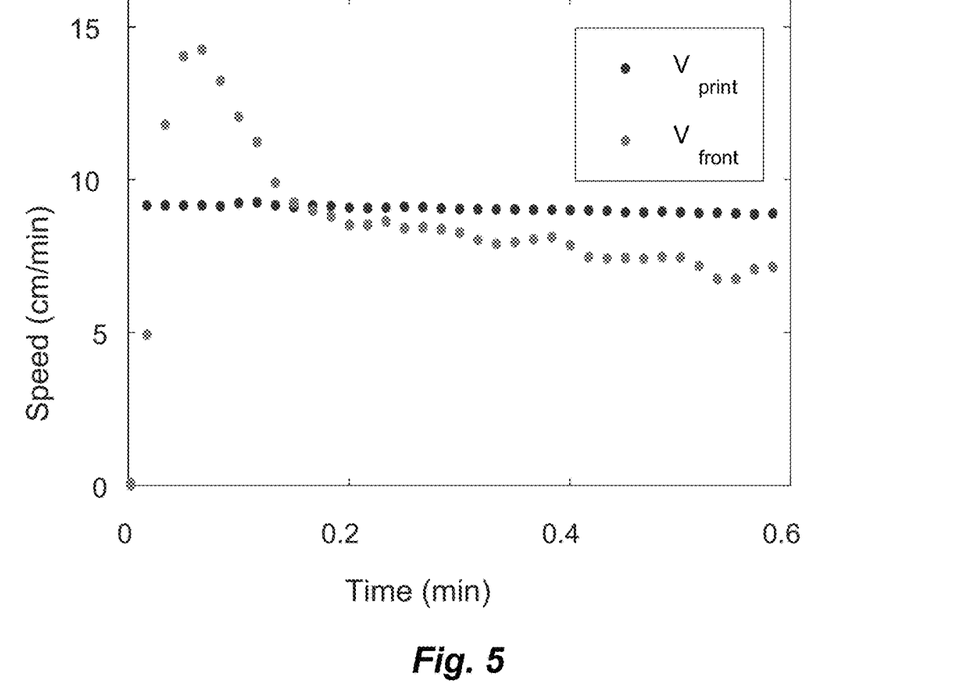
FIG. 5. Propagation front in response to gel material at ambient temperature (no equilibrating action). The plot show evolution of front speed when the print speed is high. Since the front is far behind the extruding nozzle, the gel material has warmed up to ambient temperature. The plot displays uninhibited frontal polymerization (FP) of gel material.
Figure 6:
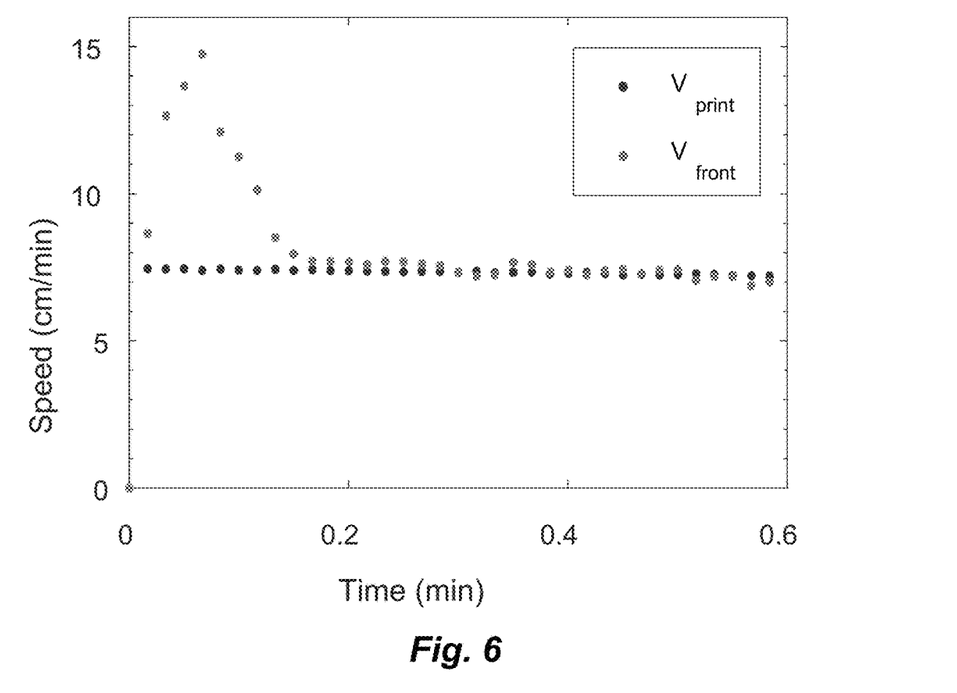
FIG. 6. Propagation front in response to gel material of a lower temperature (self-equilibrating action). The print speed is low such that the front is trailing right behind the extruding nozzle. FP for the gel with a lower temperature had capped the front velocity at the printing speed.
Figure 7:
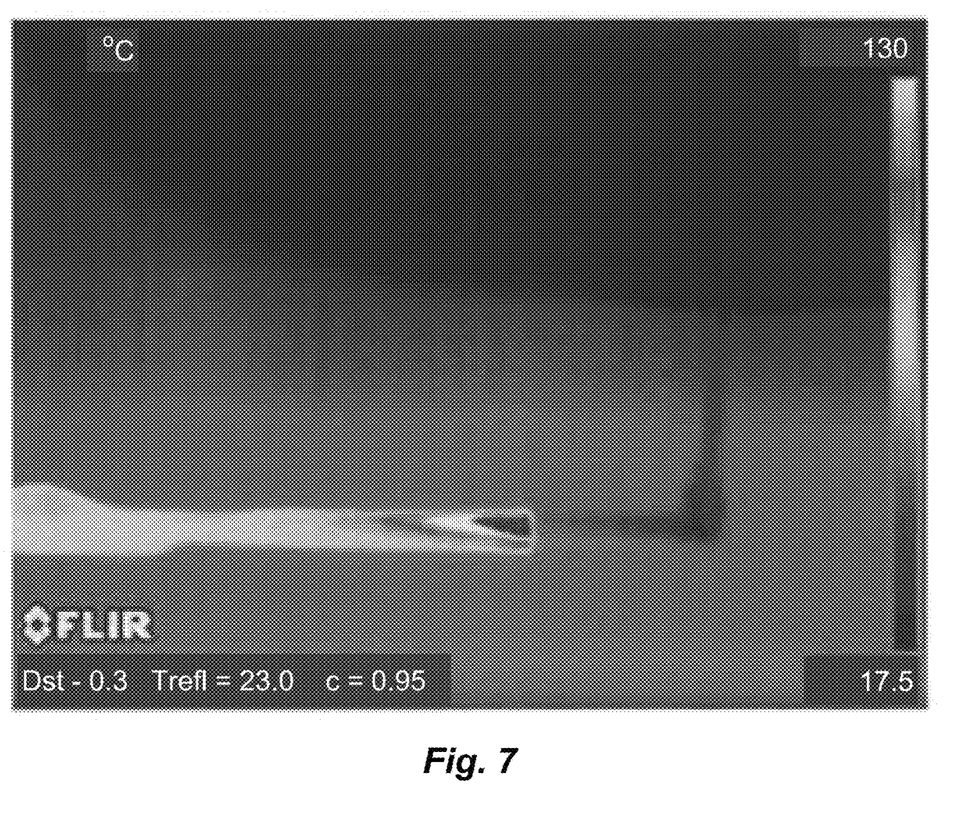
FIG. 7. Thermal images were captured by an infrared camera while 3D printing neat DCPD. The front is evidenced by a distinct heated tip, due to the exothermic nature of polymerization.
Figure 8:
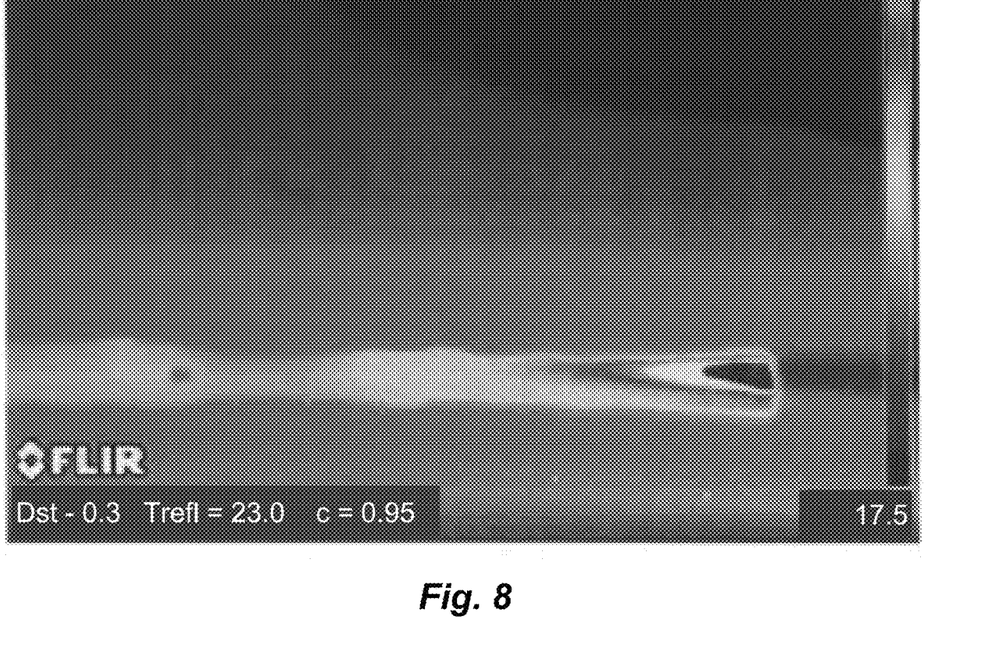
FIG. 8. Thermal image captured by an infrared camera while 3D printing neat DCPD. Captures the same propagating front as shown in FIG. 7 but the image was captured 2 seconds later.
Figure 9:
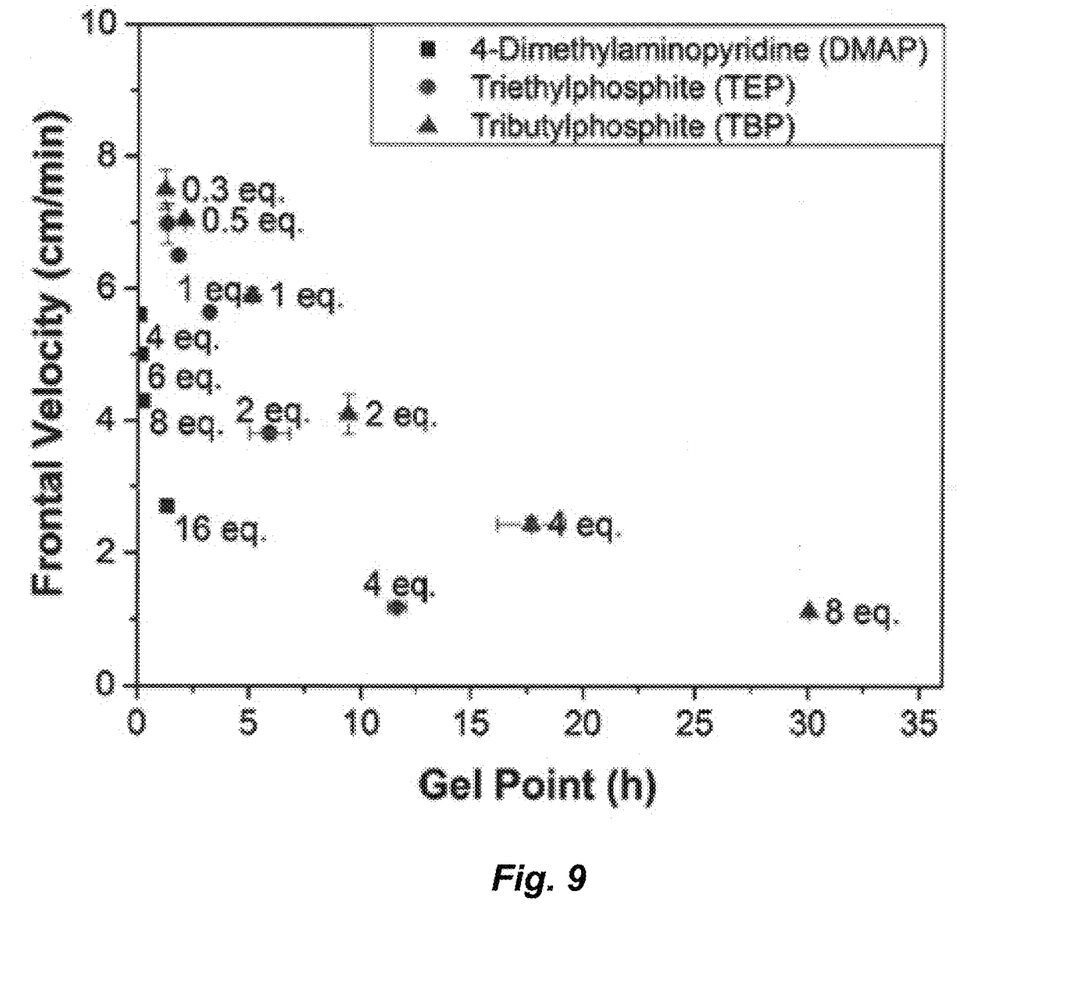
FIG. 9. Comparison of gel point and frontal velocity of different phosphite inhibitors, including DMAP, TEP, and TBP, at between 0.3 and 8 molar equivalents inhibitor to 100 ppm GC2.
Figure 10:
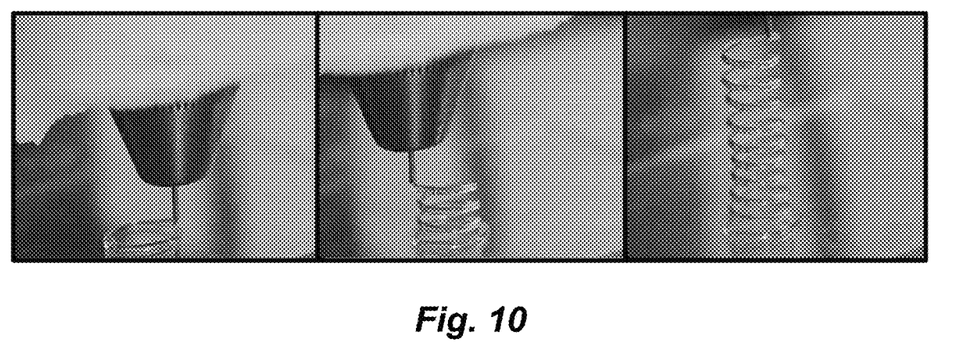
FIG. 10. Example of a 3D printed structure—a helical spring. The images show the spring at different points in time during the printing process. The printhead extrudes the partially cured gel, which is then almost immediately cured by the propagating front. As a result, the printed helix needs no support to maintain its shape during printing and is fully cured when printing is finished.
Figure 11:
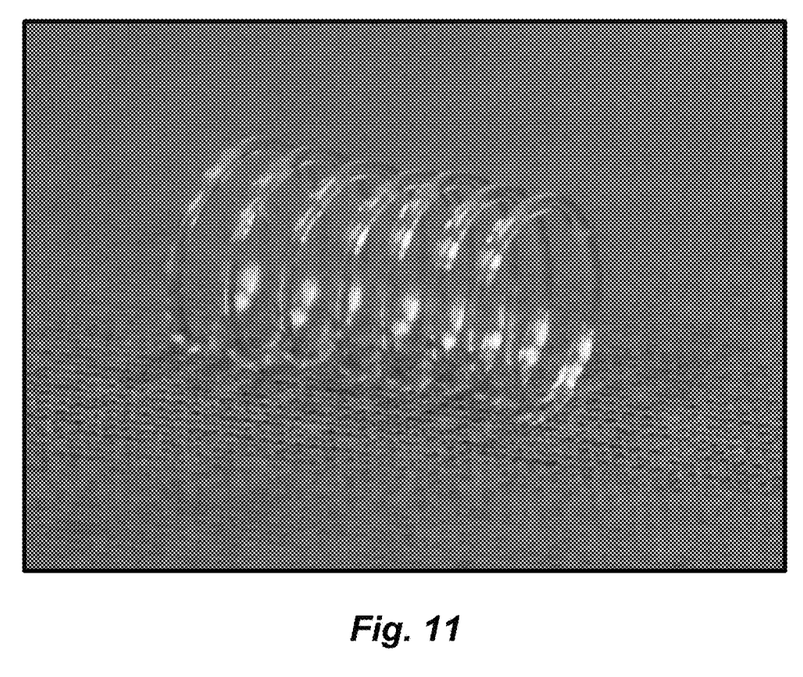
FIG. 11. Finished helical spring after completion of the printing process.
Figure 12:
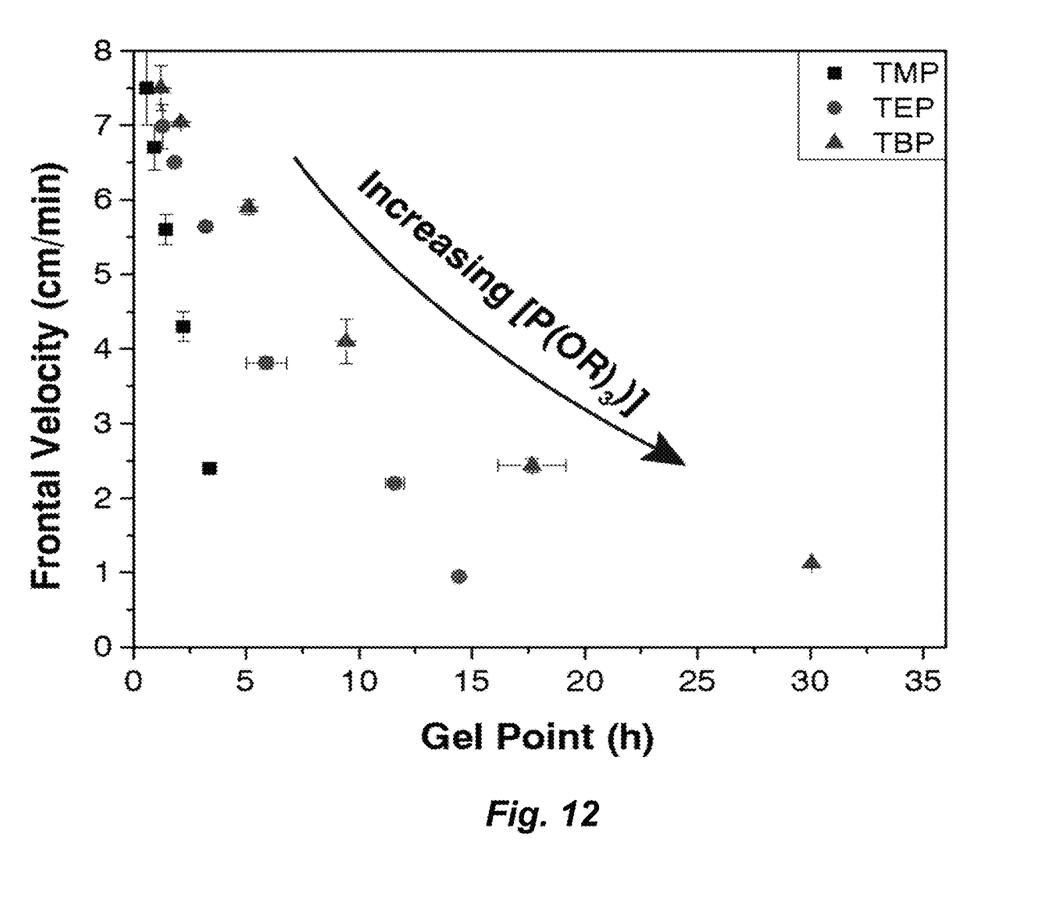
FIG. 12. Comparison of gel point and frontal velocity of different phosphite inhibitors, including TMP, TEP, and TBP, at between 0.3 and 8 molar equivalents inhibitor to 100 ppm GC2.

The frontal velocity is also a function of the gel temperature. The lower gel temperature causes the propagating front to decelerate and match the printing speed. FIG. 5 and FIG. 6 shows front deceleration naturally occurring in response to a lower print speed. This phenomenon allows the system to intelligently tune the curing process to variable print speeds, which is inevitable in the manufacturing of complex architectures.

It is also possible to incorporate continuous carbon fiber reinforcement into the printed material. It was previously demonstrated that carbon fiber accelerates FP through its thermal conductivity (see U.S. patent application Ser. No. 15/462,458 filed Mar. 11, 2017). Since the curing process is thermally driven, the addition of a carbon fiber tow to the printed gel solution can actually accelerate the printing process.

In conclusion, the development of alkyl-phosphites as potent FROMP inhibitors slows the curing process of DCPD substantially, such that it remains a viscous gel for several hours. This gel can be extruded from a 3D print head and immediately FROMPed to form structural PDCPD that requires no supporting material. In this way, complex 3D structures can be printed quickly and easily. Furthermore, the nature of the curing reaction facilitates 3D-printing of continuous fiber-reinforced composites, which are typically challenging to print.

The following Example is intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

Example

Example Materials and Methods

Formulation and Technique for 3D-Printing Via Frontal Polymerization

The 3D printable FROMP gel consists of three main components: the monomer, catalyst and inhibitor. A combination of different chemicals can be used for this technique. As such, this approach could be broadly applicable to several thermally triggered polymerizations.

Dicyclopentadiene (DCPD) and Grubbs catalyst, 2nd generation (GC2) are used as the monomer and catalyst respectively. A number of compounds were found useful for inhibiting the reactive chemistry between DCPD and GC2. This includes trimethyl phosphite (TMP), triethyl phosphite (TEP), triisopropyl phosphite (TIPP), tributyl phosphite (TBP), triphenyl phosphite (TPP) and 4-dimethylaminopyridine (DMAP).

To prepare the gel, DCPD is melted in an oven at 35° C. and combined with 5 wt. % 5-ethylidene norbornene to lower the melting point below room temperature. GC2 (1.00 mg) is dissolved in 111 µl of anhydrous toluene. TEP (0.100 µl) is then mixed into the catalyst solution, and subsequently added to 1.551 g of the DCPD solution. The final solution is transferred into 3 cc Optimum syringe barrels from Nordson EFD. The syringe barrels are then left to stand at 23.0° C. between 160 minutes to 240 minutes such that the DCPD slowly polymerizes to become a gel.

Setup for 3D Printing

Figure 1:
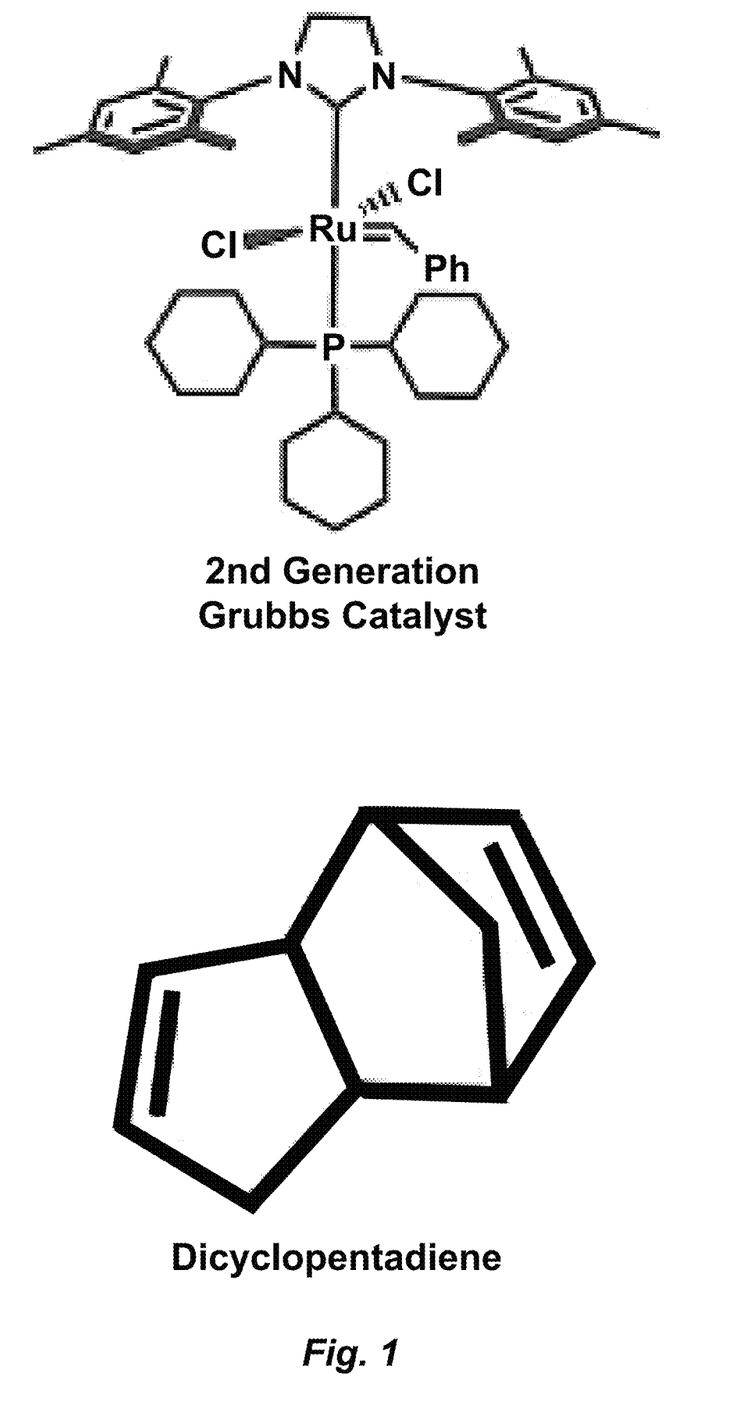
FIG. 1. Chemical Structure of the 3D printable FROMP gel constituents.
Figure 2:
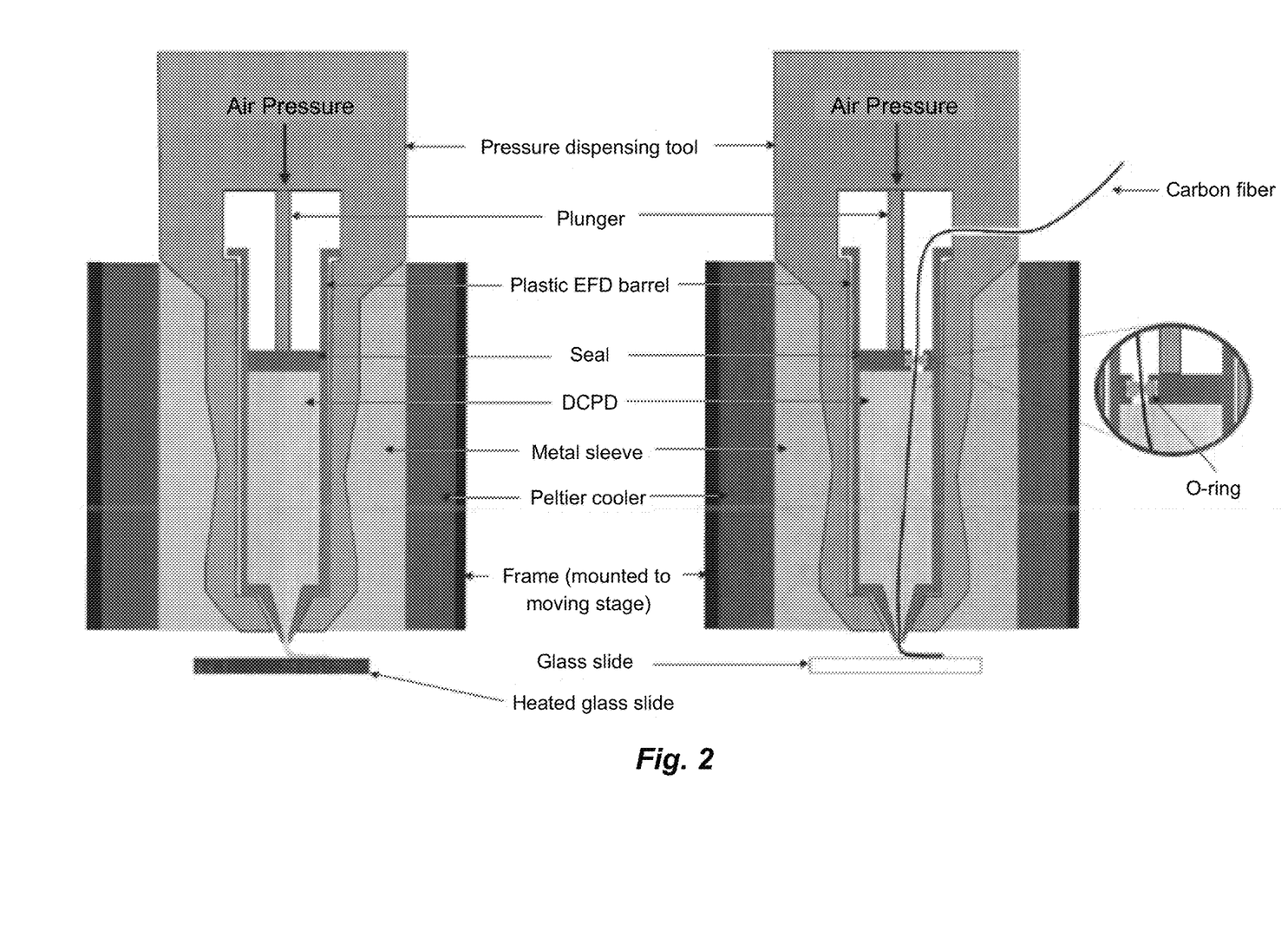
FIG. 2. Schematics of setup for printing neat DCPD (left) and carbon-fiber embed DCPD (right).
Figure 3:
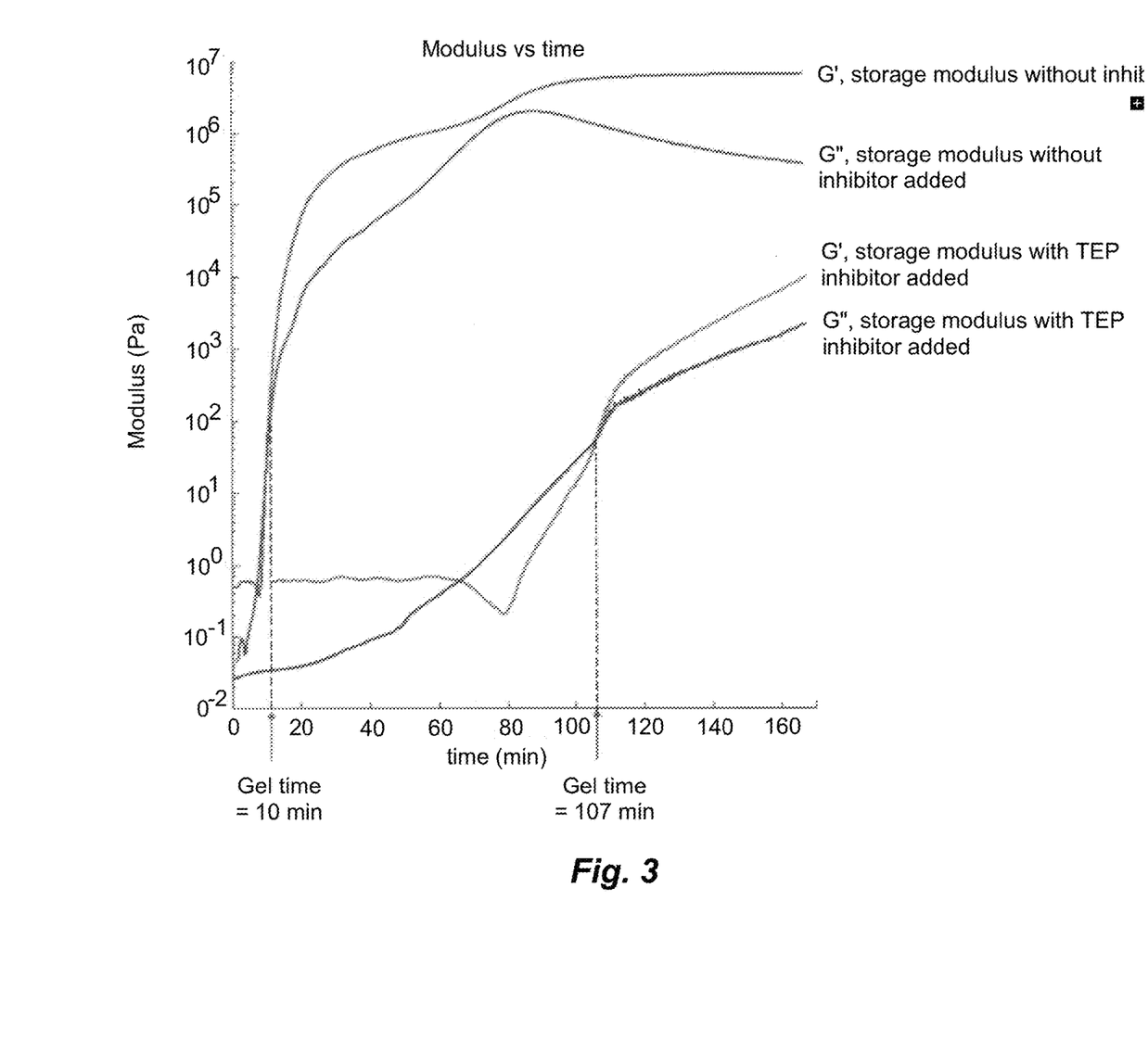
FIG. 3. Proof of TEP as an inhibitor.

Schematic of both 3D printing setups are illustrated in FIG. 2. Syringe barrels and dispense tips are used (Nordson EFD, Optimum® general purpose tips). This setup is mounted on a robotic motion-controlled stage (Model JL2000, Robocasting Enterprises). A custom-designed software (RoboCAD 2.0) may be programmed to execute specific sets of stage motion while delivering pressurized air. Air is supplied from a compressed air tank via an air-dispensing system (Model 800, Nordson EFD). The setup is cooled down to −5° C. using a Peltier cooler.

Printing Neat DCPD

The syringe barrel is filled two-thirds with DCPD gel then sealed with a piston (Nordson EFD, Optimum® cartridge pistons). It is then placed in an air-operated high-pressure dispensing tool, HP10 cc (Nordson EFD). The HP10 cc uses pressurized air (up to 2.76 MPa) to actuate a plunger that pushes down onto the seal. The compression extrudes DCPD gel through the dispense tip which nozzle diameters range from 0.10 mm to 1.54 mm.

Printing Carbon Fiber Embed DCPD

For this setup, a Teflon seal is custom-designed to keep the pressurized gel from leaking while still enabling delivery of continuous carbon fiber. It has an off-center through hole which sits a O-ring (Apple Rubber, MicrOring® Seal) of inner diameter of 0.40 mm. Continuous carbon fiber (Hexcel, HexTow® AS4C-3K) is threaded through the O-ring and the dispense tips.

The syringe barrel is filled two-thirds with DCPD gel then sealed with the custom seal. It is then placed in HP10 cc to perform the same extrusion motion. The compression extrudes carbon fiber embed DCPD through the dispense tip.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A method for fabricating a printed thermoset polymer comprising:
    a) extruding a thermoset gel from a dispensing apparatus to provide an extruded thermoset gel, the thermoset gel having a storage modulus of about 10 Pascals to about 10,000 Pascals and comprising a mixture of an organic phosphite, a ruthenium(II) catalyst, a dicyclopentadiene, and an organic solvent; and
    b) triggering a frontal polymerization of the extruded thermoset gel, wherein the frontal polymerization propagates and cures the extruded thermoset gel;
    wherein a printed thermoset polymer is printed by steps comprising steps a) and b).

2. The method of claim 1 wherein the thermoset gel is cooled below 25° C.

3. The method of claim 1 wherein the dispensing apparatus is cooled below 25° C.

4. The method of claim 1 wherein the extruded thermoset gel is extruded onto a platform that can trigger frontal polymerization.

5. The method of claim 4 wherein the platform is heated.

6. The method of claim 1 wherein the frontal polymerization propagates and cures the extruded thermoset gel instantly to about 60 minutes after the thermoset gel is extruded.

7. The method of claim 6 wherein the frontal polymerization is delayed by a sufficient amount of time to allow a second layer of the extruded thermoset gel to coalesce with a first layer of the extruded thermoset gel.

8. A method for polymerizing a thermoset gel comprising:
    a) extruding a thermoset gel onto a platform from a cooled dispensing apparatus to provide an extruded thermoset gel; and
    b) heating the platform to trigger a frontal polymerization of the extruded thermoset gel, wherein the frontal polymerization propagates and cures the extruded thermoset gel;
    wherein the thermoset gel comprises triethyl phosphite, dichloro[1,3-bis(2,4,6-trimethylphenyl)-2-imidazolidinylidene](benzylidene)(tricyclohexylphosphine)ruthenium(II), and a dicyclopentadiene;
    wherein the thermoset gel is thereby polymerized.

9. The method of claim 8 wherein the thermoset gel comprises an additive to lower the melting point of the dicyclopentadiene.

10. The method of claim 9 wherein the additive is a norbornene.

11. The method of claim 8 wherein the thermoset gel has a storage modulus of about 50 Pascals to about 5,000 Pascals.

12. The method of claim 8 wherein the extruded thermoset gel is a carbon fiber composite.

13. The method of claim 1 wherein the frontal polymerization is triggered by electromagnetic irradiation.

14. The method of claim 13, wherein the electromagnetic irradiation comprises ultraviolet light.

* * * * *